G. J. CLINE.
Pruning Implement.
No. 225,798. Patented Mar. 23, 1880.
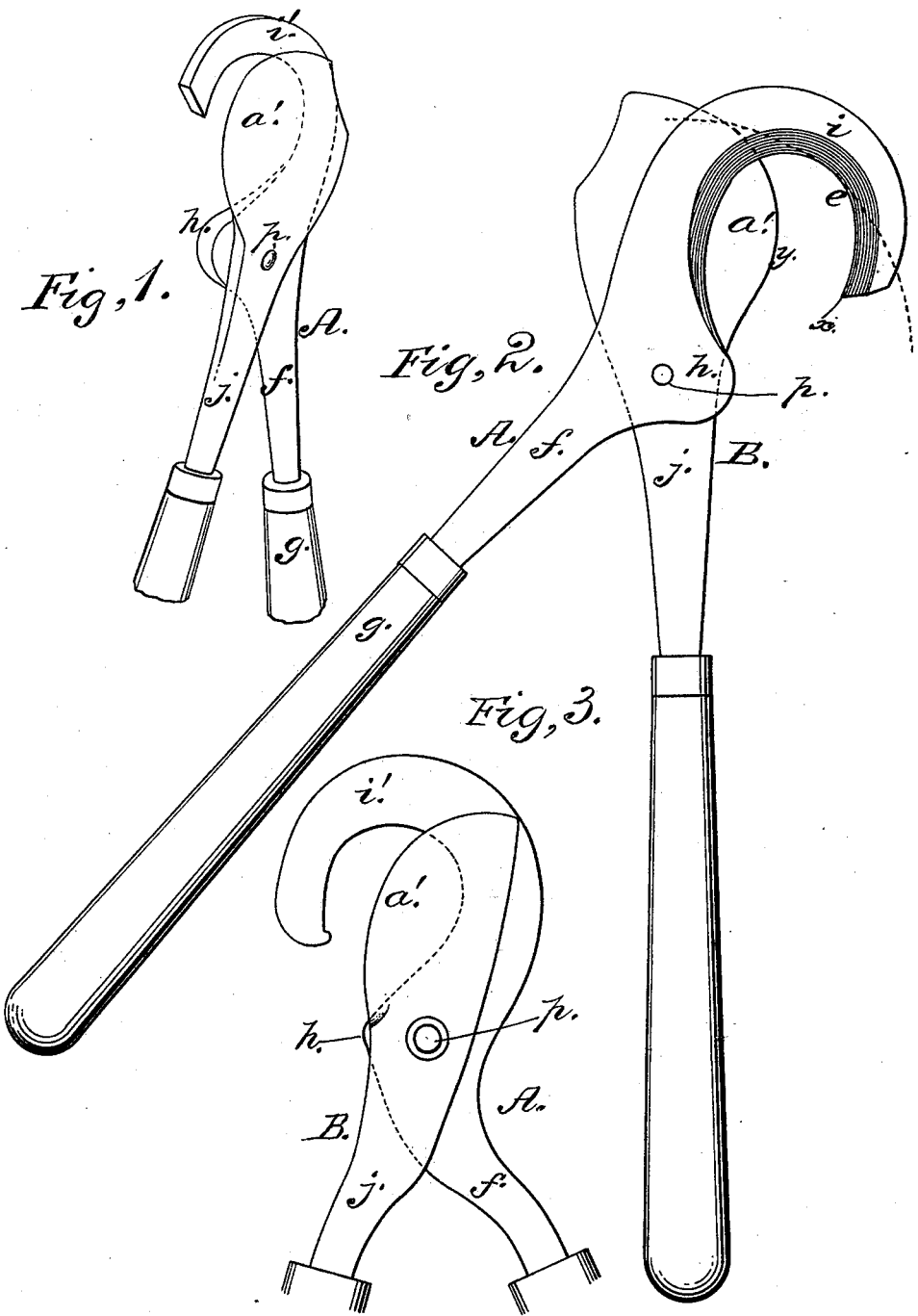
WITNESSES
Villette Anderson.
Frank J. Masi.
INVENTOR
George J. Cline,
by E. W. Anderson.
his ATTORNEY

UNITED STATES PATENT OFFICE.

GEORGE J. CLINE, OF GOSHEN, INDIANA.

PRUNING IMPLEMENT.

SPECIFICATION forming part of Letters Patent No. 225,798, dated March 23, 1880.

Application filed August 30, 1879.

*To all whom it may concern:*

Be it known that I, GEORGE J. CLINE, of Goshen, in the county of Elkhart and State of Indiana, have invented a new and valuable Improvement in Pruning-Shears; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved pruning-shears. Fig. 2 is a side view thereof, and Fig. 3 is a view of the opposite side of the same.

This invention has relation to improvements in pruning shears or scissors especially designed for trimming ornamental shrubbery, rose-bushes, box-bushes, and the like.

The object of the invention is mainly to prevent the locking of the blades by the crossing of the branch which is being severed; and the nature of the invention consists in the combination, with a deeply-curved hook-blade having a broad bearing and a sharpened point portion extending inwardly toward the pivot, of a cutting-blade having also a broad bearing, which is pivoted thereto, the said cutting-blade being so arranged as to cut from heel to point, instead of from point to heel, and its cutting-edge moving from the back of the said hook-blade toward its free inwardly bent or extended end, whereby a branch, instead of becoming clogged, will be moved out of the hook-blade, as will be hereinafter more fully set forth.

In the annexed drawings, the letter A designates the hook-blade, of which the hook portion is beveled upon its edge $i$, forming, with its plane edge $i'$, a sharp edge, $e$, and has its free end bent inward toward its back, or provided with a projection, as shown at $x$. At the junction of the hook and its shank $f$, to which is secured the handle $g$, is an angular protuberance, $h$, the face of which is in the same plane with the plane edge $i'$ of the hook, and forms a very broad bearing for the shearing-blade B. This latter is provided with a flat gradually-widening shank, $j$, and a broad convex-edged cutting portion, $a'$, lying flush upon the lug or projection and upon the hook aforesaid. The cutting-edge $y$ of the blade B is upon the edge nearest the end of hook A, and the shearing action is from the back toward the point of the said hook. The movable part of the shears is pivoted to the fixed part by a pivot, $p$, the two parts of the same not being crossed at the lug $h$ aforesaid.

The operation is as follows: The hook being engaged with a twig to be lopped off, and the shear part being in about the position shown in Fig. 2, the handles are forcibly brought together. This brings the lower part of the cutting-edge in contact with the twig, and, but for the opposition of the inwardly curved or projecting end $x$ of the hook A, would force the same out of the shears.

What I claim as new, and desire to secure by Letters Patent, is—

A pruning implement consisting of a deeply-curved hook-blade, A, having its point portion $x$ inwardly curved or extended within the pivotal arc, and a cutting-blade, B, pivoted thereto and having a broad bearing thereon, the said blade cutting from heel to point, and its shearing action exerted from the back toward the point of the said hook-blade, whereby, in the act of shearing a limb, it is moved toward the point of the shears and severed, instead of clogging the implement, substantially as specified.

In testimony that I claim the above I have hereunto subscribed my name in the presence of two witnesses.

GEORGE J. CLINE.

Witnesses:
HENRY V. CURTIS,
UTLEY B. CURTIS.